Feb. 25, 1958  F. F. LINN ET AL  2,824,734
VEHICLE AXLE AND SUSPENSION THEREFOR
Filed April 22, 1955  2 Sheets-Sheet 1
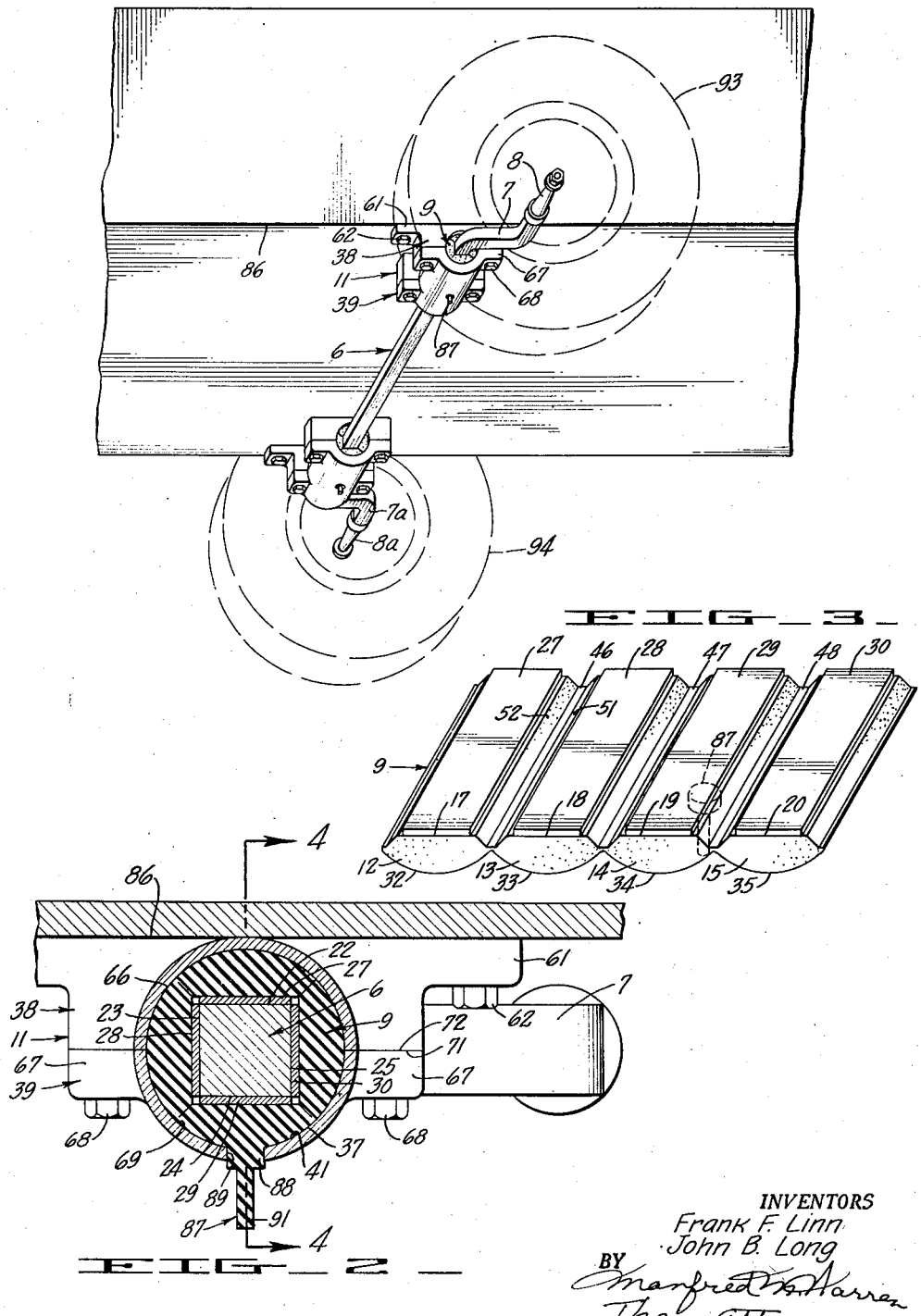
INVENTORS
Frank F. Linn
John B. Long
BY
Their attorney

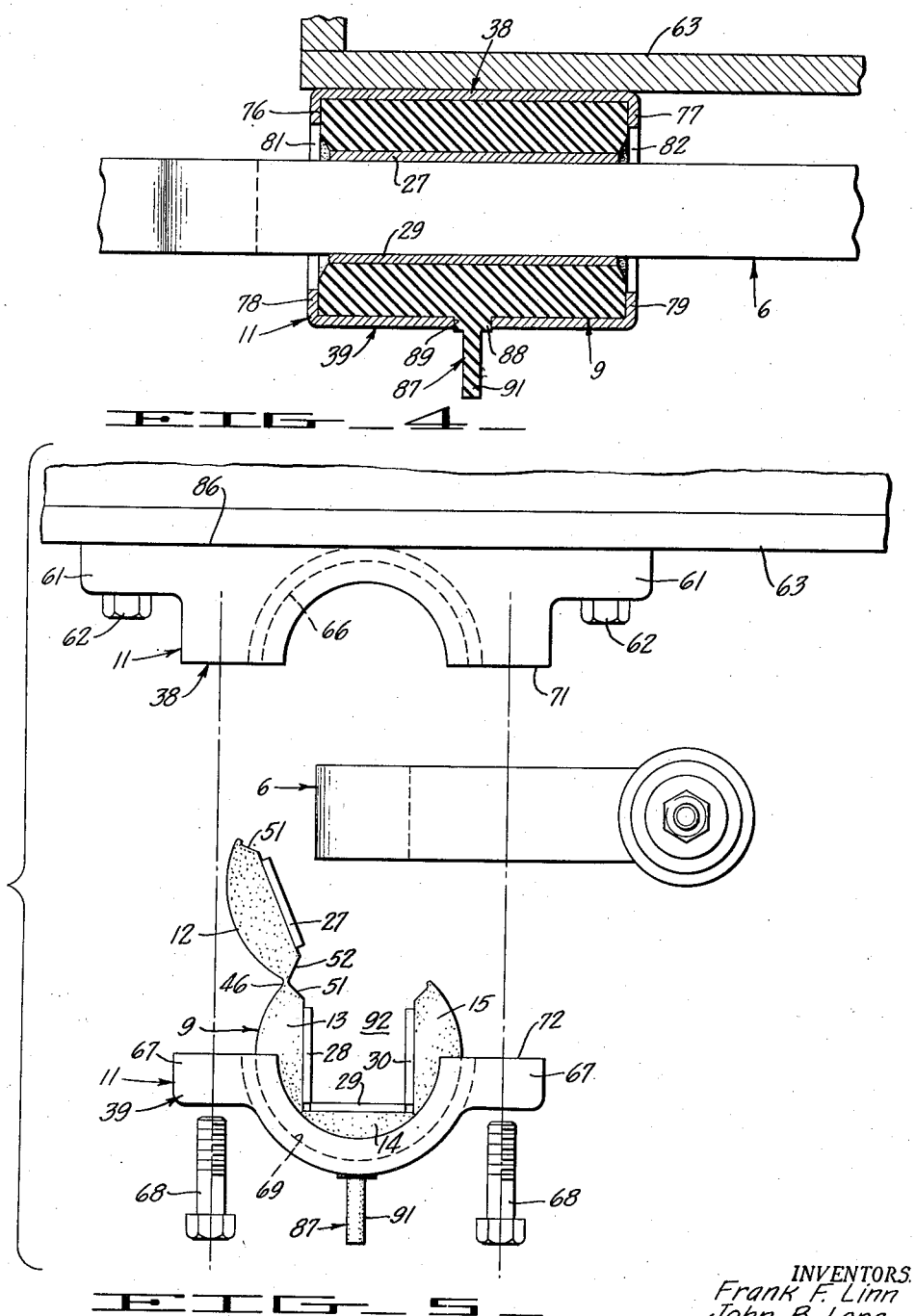

United States Patent Office 2,824,734
Patented Feb. 25, 1958

2,824,734

VEHICLE AXLE AND SUSPENSION THEREFOR

Frank F. Linn, Oakland, and John B. Long,
Walnut Creek, Calif.

Application April 22, 1955, Serial No. 503,142

16 Claims. (Cl. 267—57.1)

This invention relates to vehicle axles such as used for trailers and the like and of the general character disclosed in Linn Patent No. 2,455,787, dated December 7, 1948, and Linn Patent No. 2,426,513, dated August 26, 1947.

An object of the present invention is to provide an axle and suspension therefor which utilizes in the suspension the inherent tough, durable, resilient and self-dampening qualities of rubber in an improved form, and assembly of the parts which avoids completely the necessity of vulcanizing or otherwise bonding the rubber to the axle or the supporting members therefor, and at the same time permits the use of a minimum number of strong, sturdily formed parts which may be mass produced in a simple and inexpensive manner and easily assembled to thereby provide a highly effective and relatively low cost axle and suspension having a long and useful life.

Another object of the present invention is to provide an axle and suspension therefor which will afford a smooth, quiet, and resilient suspension in all directions of impact or shock, both in the plane of rotation of the wheels and in directions angularly thereto.

A further object of the present invention is to provide an axle and suspension as above described which is well adapted for manufacture in multiple sizes and different size vehicle chassis and load carrying capacities, and in which the unit is more easily adjustable to fit different vehicle frames.

The invention possesses other objects and features of advantage, some of which, with the foregoing, will be set forth in the following description of the preferred form of the invention, which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a perspective view of a vehicle axle and suspension therefor constructed in accordance with the present invention.

Figure 2 is a cross-sectional view of the axle and suspension.

Figure 3 is a perspective view of one of the suspension parts.

Figure 4 is a longitudinal cross-sectional view of the axle and suspension taken substantially on the plane of line 4—4 of Figure 2.

Figure 5 is an exploded view of the parts making up the axle and suspension assembly.

The axle and suspension means of the present invention consists briefly of an axle shaft 6 which in the present structure is formed with a non-circular periphery and with an arm 7 extending radially from the shaft and which terminates in a wheel spindle 8 extending parallel to but offset from the axis of the shaft 6. A rubber member 9 is arranged to surround the shaft 6 in a non-rotative fit and an axle supporting means 11 is formed to surround the rubber member 9 and to hold the latter in selected prestressed compression against the shaft periphery thereby providing a full floating resilient mounting for the axle.

As an important feature of the present invention, the rubber member 9 is formed for wrapping around the shaft 6 and for this purpose is composed of a plurality of contiguous articulated segments 12, 13, 14, and 15, having flat sides 17, 18, 19 and 20, dimensioned for positioning in opposed relation to a plurality of exterior polygonal faces 22, 23, 24 and 25 provided on the axle shaft 6. Preferably, and as here shown, a plurality of flat metal plates 27, 28, 29 and 30, are vulcanized or otherwise bonded to the sides 17–20 and provide the engagement with the polygonal faces 22–25.

As will be observed from the drawings, the sections 12–15 are preferably made of segmental cylindrical form having arcuately curved outer sides 32, 33, 34, and 35, which cooperate when the member is wrapped about the axle to provide a continuous outer cylindrical surface 37 around the shaft. In keeping with this arrangement, the supporting means 11 is formed of a plurality of sections 38 and 39 adapted for assembly about the rubber member and providing a cylindrical enclosure 41 dimensioned to surround and compressively grip the outer cylindrical surface 37. The several segments 12–15 are joined at adjacent edges by flexible web portions 46, 47, and 48, so as to permit swinging of the sections relative to each other, and each of the segments is formed with convergently tapered sides 51 and 52 leading to the plates 27–30 so as to permit the folding of the segments around the polygonal shaft as seen in Figure 2, with the plates 27–30 fitting against the polygonal faces 22–25 and the outside cylindrical periphery 37 of the rubber member thus formed embraced within the cylindrical enclosure 41 provided by the mounting means 11. As will be understood, the angle of convergence of sides 51 and 52 will depend upon the number of segments used, which in turn depends upon the number of polygonal faces provided on the shaft 6. For example, where a square shaft is used as here shown and correspondingly four segmental cylindrical sections are used, the faces 51 and 52 are cut at 45°.

As will be understood from the foregoing, the assembly as described provides a full floating, resilient suspension for the axle not only in the plane of rotation of the wheel spindle 8 but also in all directions angularly related thereto. Normally, of course, the rubber member 9 absorbs the road shock by compressing and flowing under rotative displacement of the shaft 6 within the supporting member 11, which functions in this respect as a bearing. We have found that the amount of flow of rubber under compression and occasional strain of the type herein involved decreases as the amount of such compression or strain increases. In other words, more flow is obtained with initially applied forces than with subsequently applied forces. Accordingly, as an important feature of the present invention, an initial compression is given to the rubber member by the bearing so as to produce an initial flow and thereby give the unit a strength and resiliency which it would not otherwise have. This is here effected by dimensioning the cylindrical enclosure 41 of somewhat smaller diameter than the normal unstretched cylindrical surface 37 of the rubber member so that upon assembly, the rubber member is held in selected prestressed compression against the shaft periphery. As will be thus seen in Figures 1 and 2, the two sections 38 and 39 of the supporting member 11 are formed as more or less conventionally shaped bearing base and cap members. In this case, the base section 38 is formed with spaced feet 61 for fastening as by bolts 62 to the frame 63 of the vehicle body or chassis. The base section is also formed with a substantially semi-cylindrical recess 66 which is arranged to fit around approximately one-half of the rubber member 9. The cap section 39 is here provided with spaced lugs 67 which are arranged for securing as by bolts 68 to the base section 38, and is formed with a semi-cylindrical recess 69 adapted to fit about the other half of the cylindrical periphery 37 of the rubber member in assembled position. The base and cap sections are provided with opposed faces 71 and 72 which may be brought into face to face contact upon screwing home of bolts 68 so as to complete the cylindrical enclosure 69 and apply the desired predetermined compression to the rubber member. We have found that the wall of the enclosure 69 will thus powerfully grip the cylindrical periphery 37 and thus anchor the rubber member against rotation so that it will apply its resilient resistance to rotation of shaft 6.

As a further and important feature of the present construction, means is provided for restricting the space between the sections 38 and 39 and shaft 6 at at least one end of the cylindrical enclosure 41 so as to resist the flow of rubber when under the aforementioned compression and subsequent torsional strain. This is here conveniently effected by the provision at the opposite ends of the sections of inturned angular flanges 76 and 77 in the case of the base section 38, and 78 and 79 in the case of the cap section 39. These inturned flanges cooperate to define end walls for the cylindrical enclosure and function to confine the rubber member therein against axial displacement and flow. As will be best seen from Figure 4, the inner edges of the flanges are spaced from the shaft so as to define ringlike openings 81 and 82 at the opposite ends of the bearing assembly through which restricted flow of the rubber is permitted. In connection with this feature, it will be observed that the metal plates 27–30 bonded to the rubber at the inside of the segments prevent the rubber from flowing at this point as well as uniformly spreading the operating forces over the full area of the axle faces 22–25. Thus the rubber is held against flow at its inside periphery by the metal plates and is held against flow at its outside periphery by the inturned flanges and accordingly flow is forced to take place at the center section and through the control openings 81 and 82 above described. These openings also permit limited vertical oscillation of the axle in the bearing members so that the axle shaft is cushioned and resiliently supported to withstand impact and shock occurring in all directions, both axially of and perpendicularly to the axle shaft.

In the type of axle here illustrated, it is important that the parts be assembled in proper rotative relation. For example, as seen in Figures 1 and 2, the parts should be assembled so as to normally locate the axle arm 7 in a generally horizontal position parallel to the base side 86 of the bearing member and the parting faces 71 and 72 when the axle is in initial load-bearing position. As the vehicle body is loaded, the axle will rotate in a counter-clockwise direction as viewed in Figure 1, thus placing a torsional strain on the rubber member 9. To facilitate easy and accurate assembly, we provide an index means 87 for setting the proper rotative position of the rubber member in its enclosure. Preferably, and as here shown, such means consists of a rubber pin 88, here formed on the arcuate side 34 of segment 14 and projecting outwardly therefrom for extension through an opening 89 formed in the cap section 39 of the bearing. For convenience in assembly, the pin 88 is here formed with a stem extension 91 of reduced diameter which may be first inserted through opening 89 and then pulled outwardly so as to draw the pin 88 into the opening and seat the arcuate side 34 of segment 14 against the inside surface of the recess 69 in the cap section. Preferably, the pin 88 is provided on one of the inside segments so that upon drawing the pin through the opening 89 to seat the inside segment 14, the adjacent segments 13 and 15 will be automatically positioned, as illustrated in Figure 5, in the form of an open-top channel 92 ready to receive the shaft 6 therein. After placing shaft 6 in channel 92, the remaining segment 12 may be folded down to complete the wrapping around of the rubber member and the two bearing sections 38 and 39 bolted together to complete the assembly.

The present construction is ideally suited for use in a level-load type axle of the character disclosed in the Linn patents aforementioned. This type of axle uses a solid transversely extending axle shaft 6, as illustrated in Figure 1, having radially extending arms 7 and 7a at its opposite ends and wheel spindles 8 and 8a extending from the arms in co-axial relation to each other and eccentrically to the shaft. In such a construction a deflection of wheel 93 mounted on spindle 8 will cause a corresponding deflection of wheel 94 on spindle 8a at the other side of the vehicle so as to thereby always maintain the vehicle in a level condition. While this type of axle has many well known advantages, it normally has certain disadvantages from an assembly standpoint since springs, bearings, and the like may not be slid into position over the ends of the shaft since the latter are offset, as illustrated. However, in the present case the wrap-around construction of the rubber member 9 and the sectionalized construction of the bearing members make the present suspension very well suited for use with this type of axle.

The wrap-around construction of the rubber member has various additional advantages. It provides a thin section of rubber spread out over a considerable area which facilitates its manufacture in reducing cooking and molding time. Its form in cooperation with the metal plates 27–30 and other co-acting parts avoid the necessity of vulcanizing or otherwise bonding the rubber to either the axle or the bearing housing. Thus, the rubber member and the bearings may be assembled at any place along the length of shaft 6 in order to accommodate the axle to the width of the vehicle frame 63. Also, the square axle having offset arms and spindles of the general form illustrated in Figure 1 is widely used as an underslung axle with customary leaf springs, and is accordingly widely available at a relatively low cost. Accordingly, the wrap-around sectionalized construction of the present suspension makes possible the designing of rubber and bearing parts which may be used with conventional offset axles to provide the improved torsional level-load type axle.

The length and size of the rubber member and bearing sections may be selected to develop the strength needed.

The term "rubber" is here used in a general sense and is intended to include natural and synthetic rubber and their mixtures and compounds.

We claim:

1. An axle comprising, a shaft having exterior polygonal faces, an arm extending radially from said shaft, a wheel spindle extending from said arm eccentrically to said shaft, a rubber member composed of a plurality of contiguous articulated segments having flat sides dimensioned for positioning upon said faces upon wrapping of said member around said shaft, and axle supporting means formed to surround said rubber member and dimensioned to grip the outer sides of said segments.

2. An axle comprising, a shaft having exterior polygonal faces, an arm extending radially from said shaft, a wheel spindle extending from said arm eccentrically to said shaft, a rubber member composed of a plurality of contiguous articulated cylindrical segments having flat sides dimensioned for positioning upon said faces upon wrapping of said member around said shaft, said segments having arcuately curved opposite sides defining an outer cylindrical surface around said shaft when said member is so wrapped, and axle supporting means formed to surround said rubber member and dimensioned to grip said outer cylindrical surface and to hold said rubber member in selected prestressed compression against said shaft periphery.

3. An axle comprising, a shaft having exterior polygonal faces, an arm extending radially from said shaft, a wheel spindle extending from said arm eccentrically to said shaft, a rubber member composed of a plurality of contiguous articulated segments having flat sides dimensioned for positioning in opposed relation to said faces upon wrapping of said member around said shaft, metal plates bonded to said sides for engagement with said faces, and axle supporting means formed to surround said rubber member and dimensioned to grip the outer sides of said segments.

4. An axle comprising, a shaft having exterior polygonal faces, an arm extending radially from said shaft, a wheel spindle extending from said arm eccentrically to said shaft, a rubber member composed of a plurality of articulated contiguous cylindrical segments having flat sides dimensioned for positioning in opposed relation to said faces upon wrapping of said member around said shaft, metal plates bonded to said sides for engagement with said faces, said segments having arcuately curved opposite sides defining an outer cylindrical surface around said shaft when said member is so wrapped, and axle supporting means including a plurality of sections adapted for assembly about said rubber member and providing a cylindrical enclosure dimensioned to surround and compressively grip said outer cylindrical surface.

5. An axle comprising, a shaft having exterior polygonal faces, an arm extending radially from said shaft, a wheel spindle extending from said arm eccentrically to said shaft, a rubber member composed of a plurality of articulated contiguous cylindrical segments having flat sides dimensioned for positioning in opposed relation to said faces upon wrapping of said member around said shaft, metal plates bonded to said sides for engagement with said faces, said segments having arcuately curved opposite sides defining an outer cylindrical surface around said shaft when said member is so wrapped, axle supporting means including a plurality of sections adapted for assembly about said rubber member and providing a cylindrical enclosure dimensioned to surround and compressively grip said outer cylindrical surface, and index means for setting the rotative position of said rubber member within said enclosure.

6. An axle comprising, a shaft having exterior polygonal faces, an arm extending radially from said shaft, a wheel spindle extending from said arm eccentrically to said shaft, a rubber member composed of a plurality of articulated contiguous cylindrical segments having flat sides dimensioned for positioning in opposed relation to said faces upon wrapping of said member around said shaft, metal plates bonded to said sides for engagement with said faces, said segments having arcuately curved opposite sides defining an outer cylindrical surface around said shaft when said member is so wrapped, axle supporting means including a plurality of sections adapted for assembly about said rubber member and providing a cylindrical enclosure dimensioned to surround and compressively grip said outer cylindrical surface, one of said sections being formed with an opening therethrough, and a pin formed on the arcuate side of one of said segments and projecting outwardly therefrom and being dimensioned for extension through said opening for setting the rotative position of said rubber member in said enclosure.

7. An axle comprising, a shaft having exterior polygonal faces, an arm extending radially from said shaft, a wheel spindle extending from said arm eccentrically to said shaft, a rubber member composed of a plurality of articulated contiguous cylindrical segments having flat sides dimensioned for positioning in opposed relation to said faces upon wrapping of said member around said shaft, metal plates bonded to said sides for engagement with said faces, said segments having arcuately curved opposite sides defining an outer cylindrical surface around said shaft when said member is so wrapped, and axles supporting means including a plurality of sections adapted for assembly about said rubber member and providing a cylindrical enclosure dimensioned to surround and compressively grip said outer cylindrical surface, said plates functioning to restrict axial flow of said segments at said internal flat sides and said sections being formed with inturned annular flanges spaced from said shaft faces and functioning to resist axial flow of said segments at said outer cylindrical surface.

8. A suspension means for an axle having a polygonal shaft provided with an eccentrically mounted wheel spindle comprising, a rubber member having a length dimensioned for wrapping around said shaft and being composed of a plurality of articulated segments having flat sides dimensioned for positioning in opposed relation to the polygonal faces of said shaft upon wrapping said member around said shaft, metal plates bonded to said flat sides for engagement with said shaft faces, and a bearing composed of a plurality of sections adapted for assembly about and for gripping the outer surfaces of said segments when wrapped around said shaft.

9. A suspension means for an axle having a polygonal shaft provided with an eccentrically mounted wheel spindle comprising, a rubber member having a length dimensioned for wrapping around said shaft and being composed of a plurality of articulated segments having flat sides dimensioned for positioning in opposed relation to the polygonal faces of said shaft upon wrapping said member around said shaft, metal plates bonded to said flat sides for engagement with said shaft faces, and a bearing composed of a plurality of sections adapted for assembly about and for gripping the outer surfaces of said segments when wrapped around said shaft, said sections being formed with inturned annular flanges spaced from said shaft faces and defining opposite end walls for said segments functioning to resist axial flow of said rubber member under torsional strain.

10. A suspension means for an axle having a polygonal shaft provided with an eccentrically mounted wheel spindle comprising, a rubber member having a length dimensioned for wrapping around said shaft and being composed of a plurality of articulated contiguous cylindrical segments having flat sides dimensioned for positioning in opposed relation to the polygonal faces of said shaft upon wrapping said member around said shaft, metal plates bonded to said flat sides for engagement with said shaft faces, said segments having arcuately curved opposite sides defining an outer cylindrical surface around said shaft when said member is so wrapped, a bearing composed of a plurality of sections adapted for assembly about said rubber member and providing a cylindrical enclosure dimensioned to surround and compressibly grip said outer cylindrical surface, and index means for setting the rotative position of said rubber member in said enclosure.

11. An axle and mounting means comprising, a shaft having a noncircular periphery, an arm extending radially from said shaft, a wheel spindle extending from said arm eccentrically to said shaft, an annular rubber member surrounding said shaft, a plurality of metal plates bonded to the interior surface of said rubber member in gripping non-rotative fit with said shaft periphery, and axle supporting means including a plurality of sections adapted for assembly about and for gripping and compressing said rubber member to hold said rubber member in continuous voidless prestressed compression against said shaft.

12. An axle and mounting means as characterized in claim 11 wherein said rubber member is formed with a radial longitudinally extending split extending to said interior surface between adjacent plates and to the outside surface of said member for wrapping around said shaft.

13. An axle and mounting means as characterized in claim 11 wherein said sections are formed with inturned annular flanges spaced from said shaft periphery and defining opposite end walls for said rubber member functioning to resist the flow of said rubber member under said compression and under torsional strain.

14. A suspension means for an axle having a shaft of noncircular periphery and an arm extending radially from said shaft and a wheel spindle extending from said arm eccentrically to said shaft comprising, an annular rubber member adapted to surround said shaft, a plurality of metal plates bonded to the interior surface of said rubber member and defining a noncircular opening adapted for gripping non-rotative fit with said shaft periphery, and axle supporting means including a plurality of sections adapted for assembly about and for gripping and compressing said rubber member to hold said rubber member in continuous voidless prestressed compression against said shaft.

15. A suspension means for an axle as characterized in claim 14 wherein said sections are formed with inturned annular flanges defining opposite end walls for said rubber member and functioning to resist the flow of said rubber member under said compression and under torsional strain.

16. A suspension means for an axle as characterized in claim 15 wherein one of said sections is formed with a generally radially extending opening therethrough, and said rubber member is formed with a pin projecting radially outwardly therefrom dimensioned for extension through said opening for setting the rotative position of said rubber member within said sections.

References Cited in the file of this patent

UNITED STATES PATENTS

| 131,671 | Eils | Sept. 24, 1872 |
| 1,919,033 | Noble | July 13, 1933 |
| 2,048,256 | Geyer | July 21, 1936 |
| 2,259,023 | Clark | Oct. 14, 1941 |
| 2,684,845 | Moulton | July 27, 1954 |
| 2,723,870 | Page | Nov. 15, 1955 |

FOREIGN PATENTS

| 191,116 | Switzerland | Sept. 1, 1937 |
| 281,829 | Switzerland | Aug. 1, 1952 |
| 485,077 | Great Britain | May 13, 1938 |
| 788,264 | France | Apr. 3, 1935 |